United States Patent

Rizzoli et al.

[11] Patent Number: 6,070,592
[45] Date of Patent: Jun. 6, 2000

[54] FILTER ASSEMBLY MACHINE FOR PRODUCING VENTILATED TOBACCO PRODUCTS

[75] Inventors: Salvatore Rizzoli, Bologna; Fiorenzo Draghetti, Medicina, both of Italy

[73] Assignee: G.D Societa' per Azioni, Via Pomponia, Italy

[21] Appl. No.: 09/170,664

[22] Filed: Oct. 13, 1998

[30] Foreign Application Priority Data

Oct. 14, 1997 [IT] Italy ................................. BO97A0612

[51] Int. Cl.[7] ........................................................ A24C 1/32
[52] U.S. Cl. .......................... 131/281; 131/280; 131/281; 131/908; 131/88; 209/536; 219/121.68
[58] Field of Search ..................................... 131/280, 281, 131/170 R, 23 R, 908, 88; 209/536; 118/40; 219/121 L, 121.68; 191/94; 83/868

[56] References Cited

U.S. PATENT DOCUMENTS 4,370,942  2/1983  Dowding et al. ......................... 118/40
5,598,855  2/1997  Rizzoli et al. ............................ 131/281
5,695,070  12/1997  Draghetti ................................. 209/536

FOREIGN PATENT DOCUMENTS 2094211  9/1982  United Kingdom .
2267474  12/1993  United Kingdom .
2283402  5/1995  United Kingdom .

Primary Examiner—James Derrington
Assistant Examiner—Mark Halpern
Attorney, Agent, or Firm—Ladas & Parry

[57] ABSTRACT

A filter assembly machine for producing ventilated tobacco products; the machine having a conveying drum in turn having a number of peripheral seats for successively feeding the products along a given path extending about an axis of the drum; the products being housed inside the respective seats with respective longitudinal axes parallel to the axis of the drum, and being rotated at least 360° about their respective axes as they are fed along the path; the machine also having a perforating device associated with the drum to form a number of perforations in each product; and an extracting device and an optical device for controlling the products being provided along the path and mounted along the outer periphery of the drum.

17 Claims, 5 Drawing Sheets

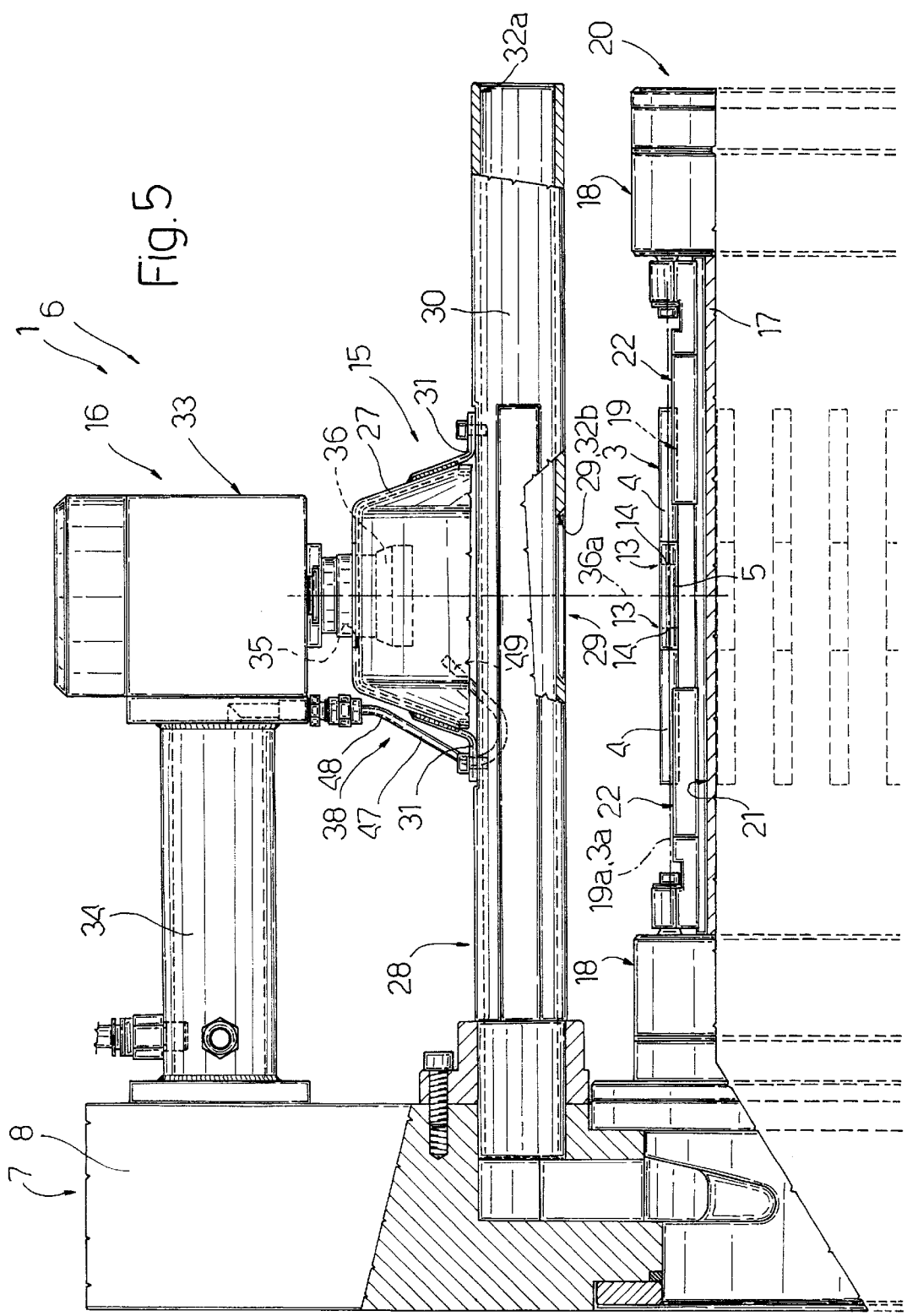

FILTER ASSEMBLY MACHINE FOR PRODUCING VENTILATED TOBACCO PRODUCTS

BACKGROUND OF THE INVENTION

The present invention relates to a filter assembly machine for producing ventilated tobacco products.

Ventilated tobacco products are produced using filter assembly machines comprising a number of conveying drums, which feed along a given path a succession of products defined by two cigarette portions and by a double filter interposed between the two cigarette portions along said path, and which are substantially tangent to one another at respective transfer stations where the products are transferred from one drum to another.

Filter assembly machines of the above type also comprise a laser perforating device for forming a number of perforations in the products; and an optical control device for determining the external condition of the products. Both devices are associated with one of the conveying drums on the filter assembly machine, which drum comprises a number of peripheral rotary seats for housing respective products oriented with the respective longitudinal axes parallel to the axis of rotation of the drum, and which rotate the products by at least 360° about the respective longitudinal axes as the products are fed about the axis of the drum. Filter assembly machines of the above type have several technical drawbacks. The fact that both the laser perforating and optical control devices are associated with the same conveying drum impairs operation of the optical control device, by the fumes and dust produced during perforation settling between the optical control device and the products inside the respective seats on the conveying drum, thus impairing the reliability of the optical control results and eliminating any economic and structural advantages to be gained by associating both devices with the same conveying drum.

SUMMARY OF THE INVENTION

It is an object of the present invention to provide a filter assembly machine for producing ventilated tobacco products, which provides for eliminating the aforementioned drawbacks, and, in a straightforward, low-cost manner, for enabling correct optical control of the external condition of the products on the same conveying drum on which the laser perforation operation is performed.

According to the present invention, there is provided a filter assembly machine for producing ventilated tobacco products; the machine comprising a conveying drum having a number of peripheral seats for feeding respective products along a given conveying path extending partly about an axis of the drum; each peripheral seat having a respective longitudinal axis parallel to the axis of the drum, and rotating about said respective longitudinal axis and about the axis of the drum; and the machine also comprising a perforating device associated with the drum to form a number of ventilation holes in each product, and an optical control device located along the periphery of the drum to determine the external condition of the products; the machine being characterized by the perforating device being associated with an extracting device located along the periphery of said drum to extract by suction the fumes and dust produced during perforation, and to define a protective shield.

BRIEF DESCRIPTION OF THE DRAWINGS

A non-limiting embodiment of the present invention will be described by way of example with reference to the accompanying drawings, in which:

FIGS. 4 and 5 show two side views, with parts in section and parts removed for clarity, of respective details of FIG. 2.

DETAILED DESCRIPTION OF THE INVENTION

Figure 1:
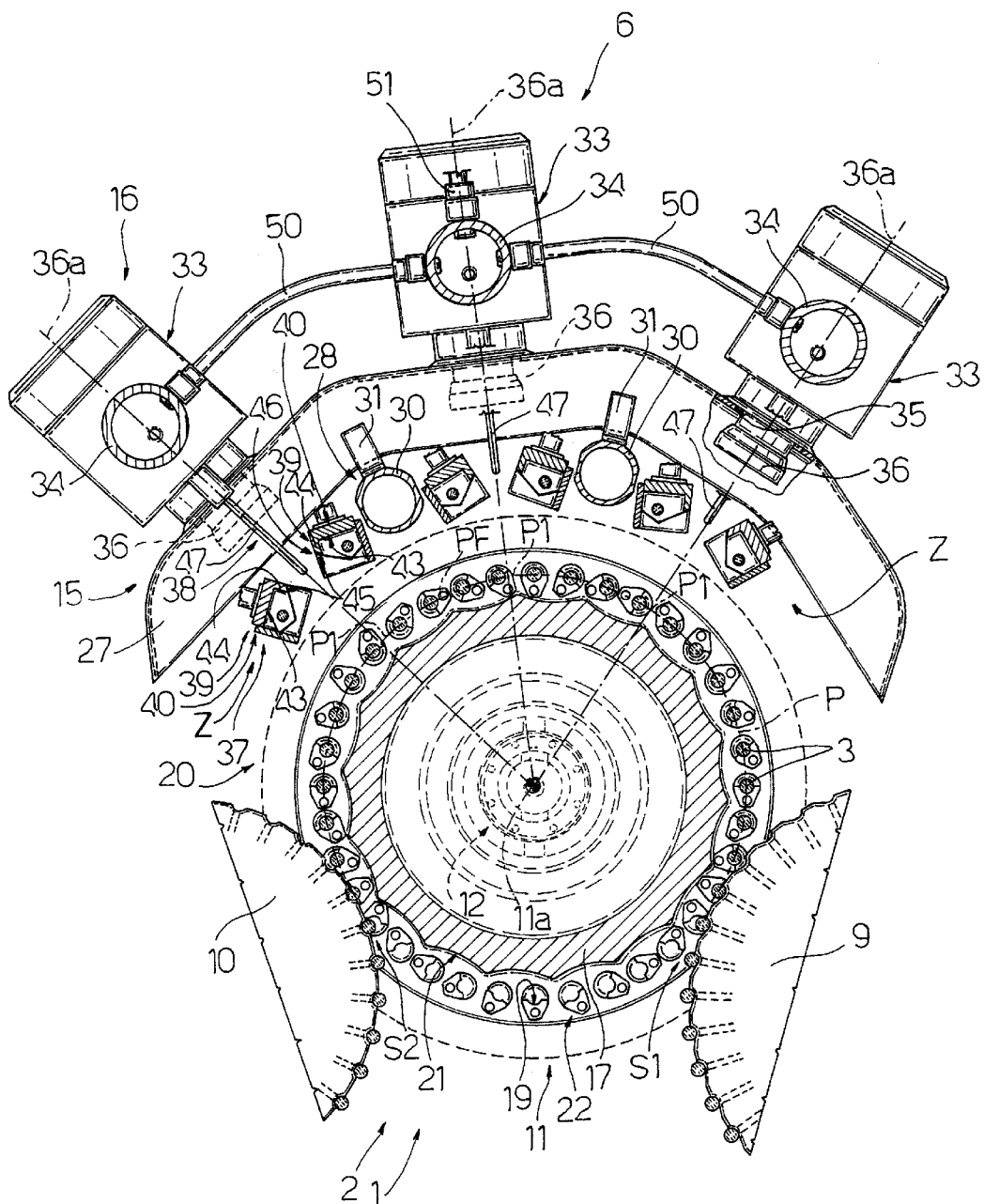
FIG. 1 shows a front view, with parts in section and parts removed for clarity, of a preferred embodiment of the machine according to the present invention.
Figure 2:
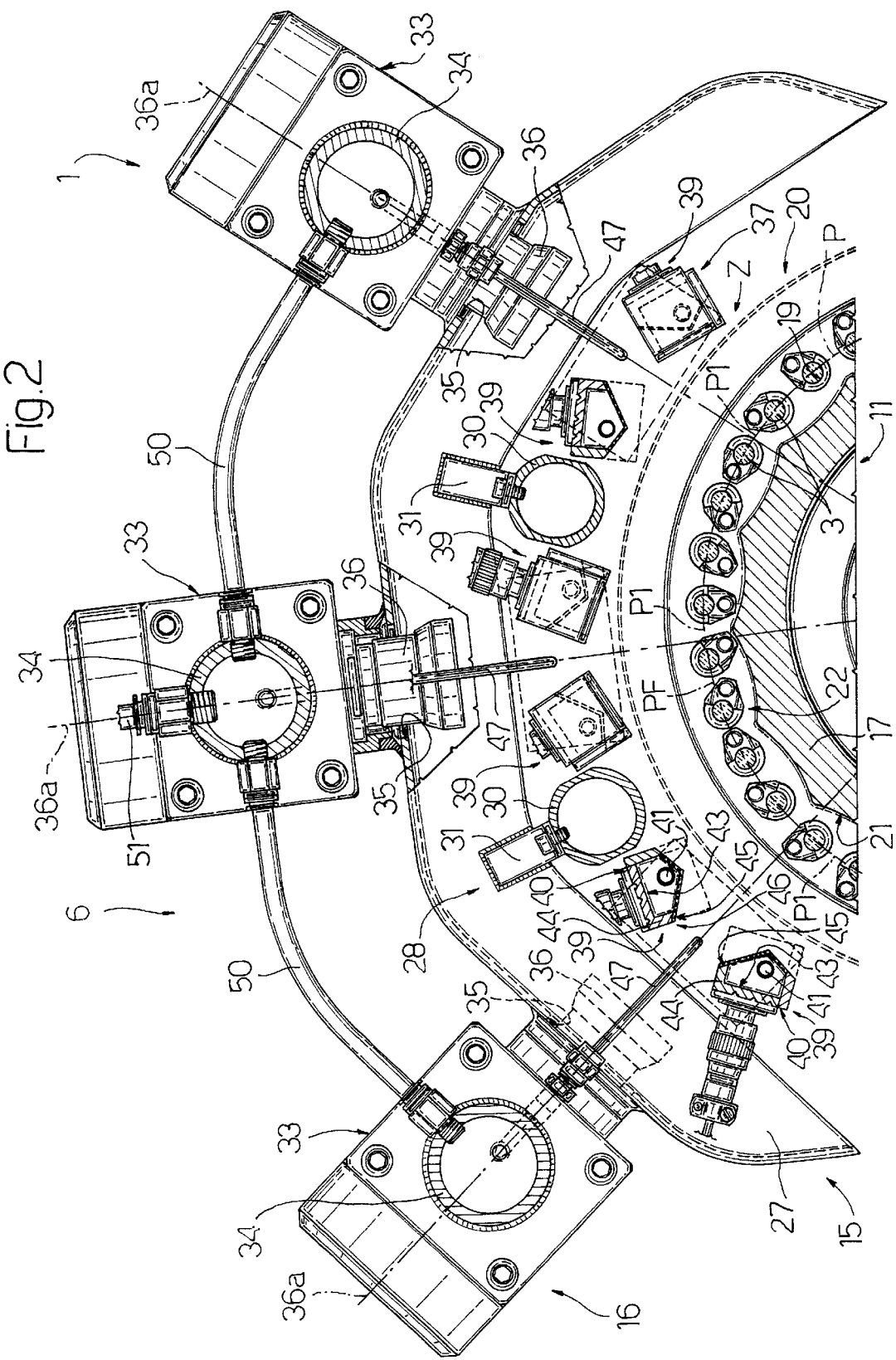
FIG. 2 shows a larger-scale view, with parts in section and parts removed for clarity, of a detail of FIG. 1.
Figure 3:
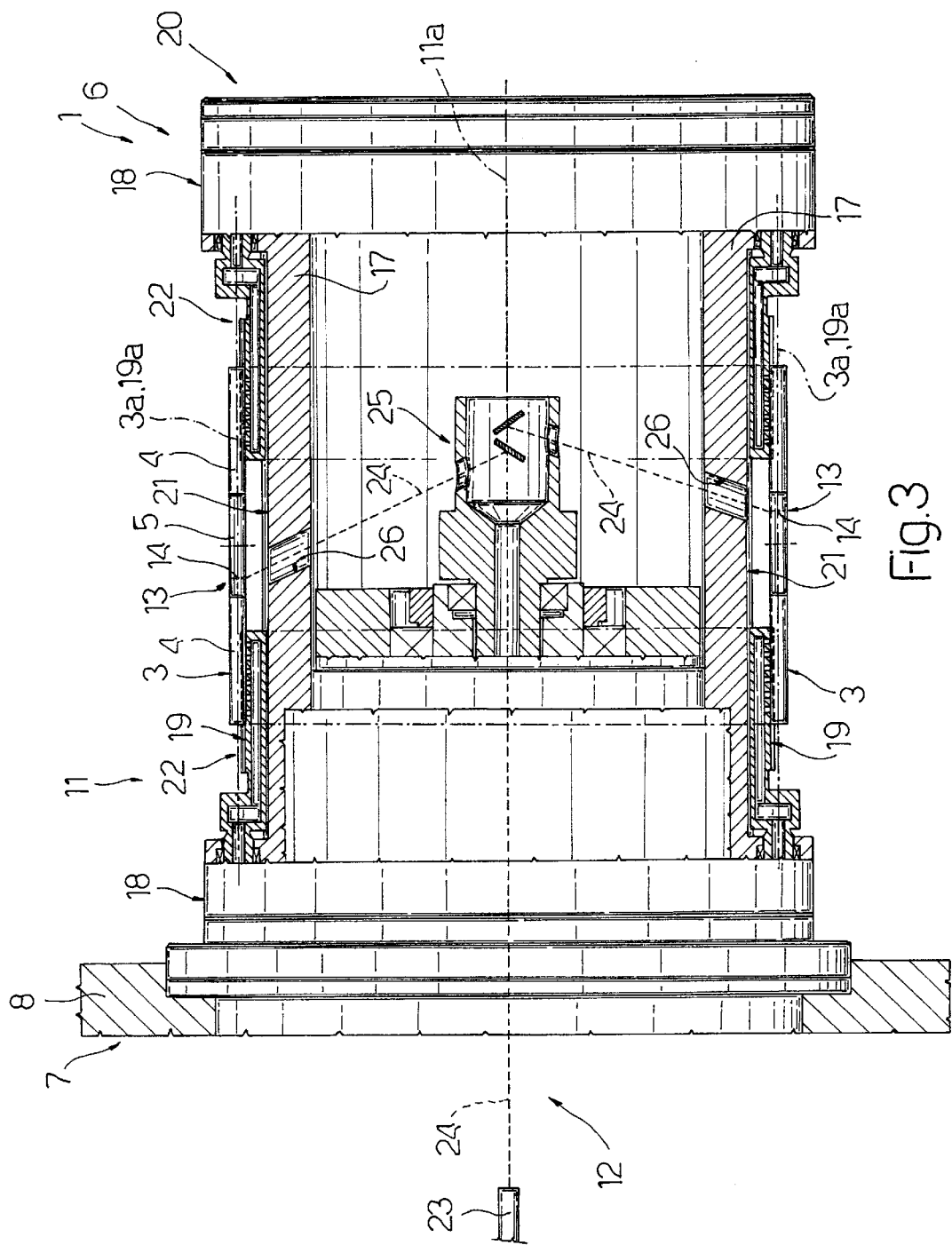
FIG. 3 shows a side view, with parts in section and parts removed for clarity, of a detail of FIG. 1.

Numeral 1 in FIGS. 1, 2 and 3 indicates a central portion of a filter assembly machine (indicated as a whole by 2) for producing ventilated tobacco products 3, each comprising two cigarette portions 4 aligned along a respective longitudinal axis 3a, and a double filter 5 interposed between portions 4.

Portion 1 comprises a unit 6 for perforating and controlling products 3; a frame 7 having a vertical wall 8 supporting unit 6; an input drum 9 for supplying products 3 to unit 6; and an output drum 10 located substantially on the opposite side of unit 6 to drum 9, and for receiving products 3 from unit 6.

Unit 6 comprises a conveying drum 11, which is fitted in rotary manner to frame 7 to rotate about a respective horizontal axis of rotation 11a crosswise to wall 8, is substantially tangent to both drums 9 and 10 at respective stations S1 and S2 where products 3 are transferred from drum 9 to drum 11 and from drum 11 to drum 10, and provides for successively feeding products 3 along a conveying path P extending about axis 11a and between stations S1 and S2, which are separated angularly along path P by an angle of 240° about axis 11a.

Unit 6 also comprises a laser perforating device 12 substantially housed inside drum 11 to form two parallel rings 13 of surface ventilation holes or perforations 14 at opposite ends of each double filter 5 of each product 3; an extracting device 15 mounted along path P and associated with device 12 to aspirate the fumes and dust produced by the formation of perforations 14 in products 3; and an optical control device 16 associated with and located outside drum 11, to determine the external condition of products 3 traveling between stations S1 and S2.

As shown more clearly in FIG. 3, drum 11 comprises a cylindrical tubular body 17, which is mounted coaxially with axis 11a, is fitted in rotary manner to wall 8 so as to rotate continuously about axis 11a, and extends outwards of machine 2 from wall 8. Drum 11 also comprises two cylindrical end portions 18 at opposite ends of body 17; and a number of peripheral seats 19 equally spaced about axis 11a and about a periphery 20 of drum 11, and substantially facing an outer surface 21 of body 17. Seats 19 have respective axes of rotation 19a parallel to axis 11a of drum 11, and house products 3 with respective axes 3a substantially coincident with axes 19a, to feed products 3, crosswise to axes 3a, between stations S1 and S2.

Each peripheral seat 19 comprises a pair of known gondolas 22, which are fitted to and project from respective portions 18, are located opposite and aligned with each other along respective axis 19a, are separated by a distance approximately equal to but no less than the length of a double filter 5, and retain portions 4 of respective product 3 by suction, leaving the outer surface of filter 5 free. The gondolas 22 in each pair are connected mechanically to each other in known manner, and are connected mechanically to drum 11, by a known epicyclic transmission (not shown) housed inside one of portions 18, to rotate simultaneously about respective axis 19a and about axis 11a of drum 11.

Each pair of gondolas 22 provides for feeding respective product 3 along a perforating path PF forming part of path P, and performs at least two complete turns about respective axis 19a to rotate respective product 3 about axis 3a along path PF. More specifically, path PF extends between stations S1 and S2, and the number of complete turns of each pair of gondolas 22 may be other than as stated above, depending on the number of perforations 14 in each ring 13.

Perforating device 12 comprises a laser source 23 for emitting a laser beam 24 along axis 11a of drum 11; and a known reflecting and focusing head 25 located along axis 11a and inside body 17 to reflect beam 24 onto periphery 20 through a number of radial holes 26 formed through body 17, and to focus beam 24 along path PF and on said outer surface of each product 3, i.e. substantially at each seat 19, to form rings 13 of perforations 14.

Extracting device 15 comprises a collecting hood 27, which is connected to wall 8 of frame 7 as described in detail later on, is located outside drum 11 along at least perforating path PF, and is separated from drum 11 by a given distance—measured in the radial direction of drum 11—to define an extracting region Z with the periphery 20 of drum 11. Hood 27 has a substantially U-shaped cross section, is mounted with its concavity facing drum 11, and is made of nonreflecting material.

As shown in FIG. 5, extracting device 15 also comprises a suction device 28, which in turn comprises at least one inlet 29 at extracting region Z, and at least one suction conduit 30 extending through region Z. In the embodiment shown, device 28 comprises two conduits 30 parallel to axis 11a of drum 11 and in an intermediate position between drum 11 and hood 27, which is connected to conduits 30 by a number of brackets 31 and is supported by conduits 30 in an intermediate position between portions 18, i.e. directly facing seats 19.

Each conduit 30 has two openings 32a and 32b: opening 32a is an end opening; and opening 32b is formed in the side of conduit 30 facing drum 11, and defines inlet 29. The outlets of conduits 30 are connected to a known aspirator (not shown) forming part of extracting device 15, and which creates an air current inside conduits 30 to extract said fumes and dust by suction from region Z.

Figure 4:
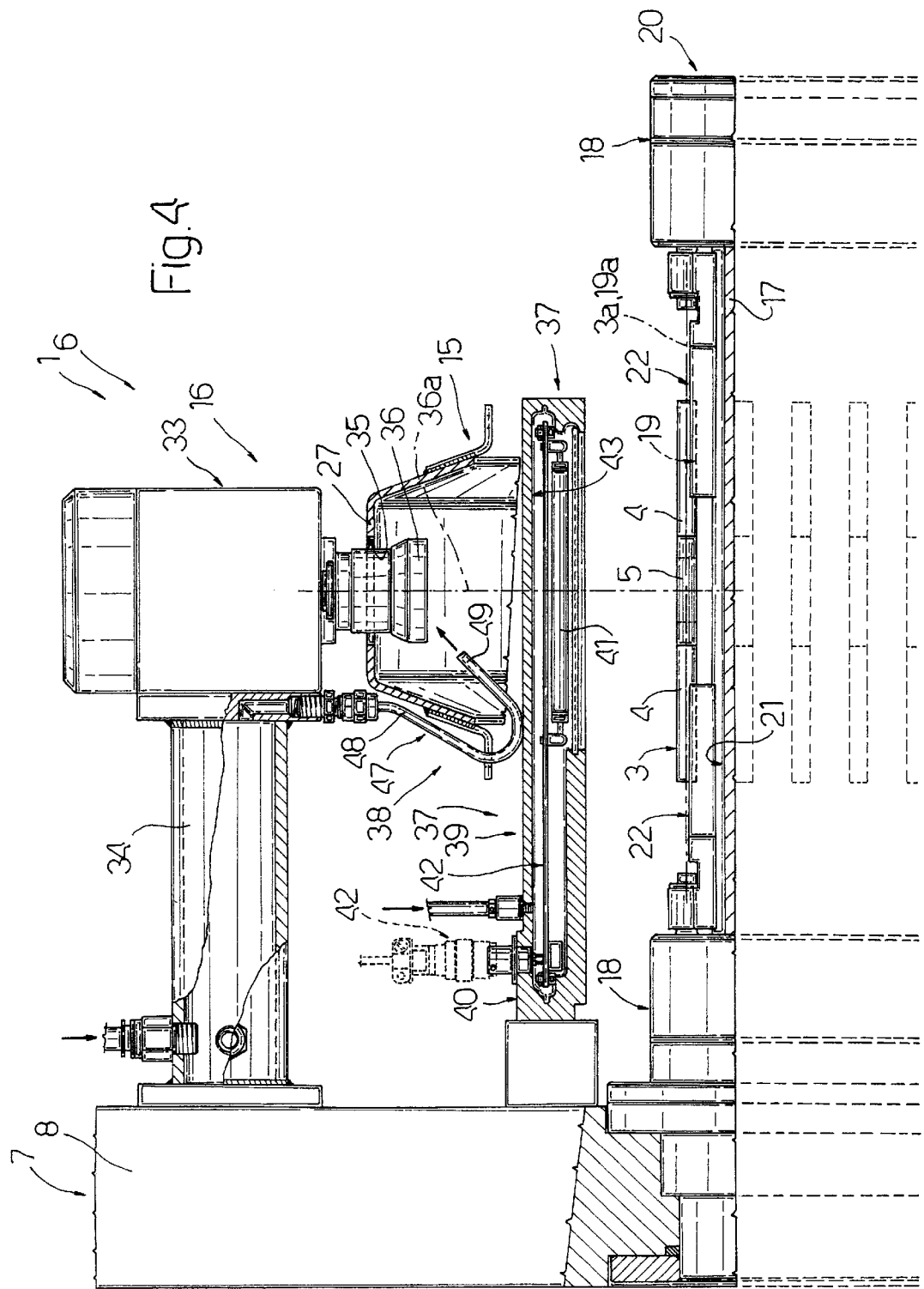

As shown in FIG. 4, optical control device 16 comprises three optical detectors or television cameras 33, which are fitted to frame 7 by respective tubular brackets 34 crosswise to wall 8, and are fitted through respective holes 35 formed through hood 27. Cameras 33 have respective lenses 36 housed inside the concavity of hood 27 and facing drum 11 to pick up respective control portions P1 of path P and to observe and determine the external condition of products 3 fed by drum 11 along portions P1. The three cameras 33 alternate with the two conduits 30 along path P, and respective lenses 36 have respective optical axes 36a aligned along respective radial directions of drum 11. More specifically, axes 36a are crosswise to and impinge on the axis of rotation 11a of drum 11, and are equally spaced angularly and coplanar with one another; and control portions P1 are contiguous to cover a total of at least a 360° rotation of each seat 19 about respective longitudinal axis 19a along path P.

Optical control device 16 also comprises a lighting device 37 extending through extracting region Z, in an intermediate position between hood 27 and drum 11, to light control portions P1 of path P; and a pneumatic cleaning device 38 for cleaning lenses 36 by means of an air jet.

More specifically, device 37 comprises, for each camera 33, a pair of lamps 39 located along path P, on opposite sides of optical axis 36a of camera 33, to light respective portion P1. Each lamp 39 comprises a lamp-holder 40 fitted to and projecting from wall 8, and extending parallel to axis 11a of drum 11 beneath hood 27; a bulb 41 fitted to lamp-holder 40; an electric circuit 42 for supplying bulb 41; and a reflecting shield 43 interposed between lamp-holder 40 and bulb 41 to reflect and direct the light rays at least onto respective portion P1. The reflecting shields 43 of each pair of lamps 39 are substantially U-shaped with the respective concavities facing path P, and have respective lateral walls 44 facing each other and axis 36a of respective lens 36, and which in turn have respective beveled longitudinal edges 45 defining a window or opening 46 of a width equal to the viewing range of respective lens 36.

Pneumatic cleaning device 38 comprises, for each camera 33, a hook-shaped conduit 47, the inlet end 48 of which is fitted to bracket 34 and connected by bracket 34 to a known pneumatic device (not shown), and the outlet end 49 of which is defined by a nozzle housed inside the concavity of hood 27 and oriented towards lens 36 of respective camera 33. Device 38 also comprises two tubes 50 connecting tubular brackets 34 of the lateral cameras 33 to bracket 34 of central camera 33; and a further tube 51 connecting bracket 34 of central camera 33 to said pneumatic device.

Operation of filter assembly machine 2, and in particular of unit 6 for perforating and controlling products 3, is clearly understandable from the foregoing description, and therefore requires no further explanation.

What is claimed is:

1. A filter assembly machine for producing ventilated tobacco products; said machine (2) comprising a conveying drum (11) having a number of peripheral seats (19) for feeding respective products (3) along a given conveying path (P) extending partly about an axis (11a) of the drum (11); each peripheral seat (19) having a respective longitudinal axis (19a) extending parallel to the axis (11a) of the drum (11), and rotatable about said respective longitudinal axis (19a) and about the axis (11a) of the drum (11); a perforating device (12) associated with the drum (11) to form a number of ventilation holes (14) in each product (3), an optical control device (16) located along the periphery (20) of the drum (11) to determine an external condition of the products (3); said perforating device (12) being associated with an extracting device (15) located along the periphery of the drum (11) to extract by suction fumes and dust produced during perforation, and to define a protective shield, said extracting device (15) comprising covering and protecting means (27) mounted outside said drum (11), along said conveying path (P), and at a given distance from the drum (11); said perforating device (12) comprising a laser source (23) for emitting a laser beam (24), and reflecting and focusing means (25) housed inside said drum (11) to reflect the laser beam (24) substantially towards said covering and protecting means (27), and to focus the laser beam (24) along a perforating path (PF) of said products (3) and substantially at said peripheral seats (19); the perforating path (PF) defining a substantially central portion of said conveying path (P).

2. A machine as claimed in claim 1, wherein said covering and protecting means (27) comprises a collecting hood (27), which is mounted outside said drum (11), along at least said perforating path (PF), and defines an extracting region (Z) with the periphery (20) of the drum (11).

3. A machine as claimed in claim 2, wherein said hood (27) has a substantially U-shaped cross section, and is mounted with its concavity facing said drum (11).

4. A machine as claimed in claim 2, wherein said hood (27) is made of nonreflecting material.

5. A machine as claimed in claim 2, wherein said extracting device (15) comprises suction means (28) having at least one inlet (29) at said extracting region (Z).

6. A machine as claimed in claim 5, wherein said suction means (28) comprises at least one suction conduit (30) extending through said extracting region (Z) and having a respective opening (32*b*) defining said inlet (29).

7. A machine as claimed in claim 6, wherein said opening (32*b*) in said conduit (30) faces said drum (11).

8. A machine as claimed in claim 6, wherein said conduit (30) extends substantially parallel to the axis (11*a*) of said drum (11).

9. A machine as claimed in claim 2, wherein said optical control device (16) comprises a number of optical detectors (33) fitted to said covering and protecting means (27).

10. A machine as claimed in claim 9, wherein said optical detectors (33) comprise by respective television cameras (33) fitted through said hood (27) and each having a respective lens (36) facing said drum (11); each lens (36) being housed inside the hood (27) to view a respective control portion (P1) of said conveying path (P).

11. A machine as claimed in claim 10, wherein each said lens (36) has a respective optical axis (36*a*) aligned along a respective radial direction of said drum (11).

12. A machine as claimed in claim 11, wherein said optical axes (36*a*) are crosswise to and impinge on the axis of rotation (11*a*) of said drum (11), and are equally spaced angularly and coplanar with one another; said control portions (P1) being contiguous to cover a total of at least one 360° rotation of each said seat (19) about the respective longitudinal axis (19*a*).

13. A machine as claimed in claim 12, wherein said optical control device (16) comprises lighting means (37) for lighting said control portions (P1) of said conveying path (P).

14. A machine as claimed in claim 13, wherein said lighting means (37) extends through said extracting region (Z) in an intermediate position between said drum (11) and said hood (27).

15. A machine as claimed in claim 14, wherein said lighting means (37) comprises, for each said television camera (33), a pair of lamps (39) located along said conveying path (P) and on opposite sides of the optical axis (36*a*) of the respective television camera (33); each lamp (39) in each pair of lamps (39) comprising a respective reflector (43) defining, with the reflector (43) of the other lamp (39) in the same pair of lamps (39), a window (46) for the respective lens (36); each window (46) allowing the respective lens a viewing range equal to the respective control portion (P1).

16. A machine as claimed in claim 10, wherein said optical control device (16) comprises cleaning means (38) associated with said optical detectors (33) and for cleaning said lenses (36).

17. A machine as claimed in claim 16, wherein that said cleaning means (38) comprises pneumatic cleaning means, including, for each optical detector (33), a respective nozzle (49) oriented towards the respective lens (36).

\* \* \* \* \*